April 11, 1967 E. A. RUBIN 3,313,795
METHOD OF TREATING A LIQUID CONTAINING DISSOLVED
PROTEINACEOUS CONSTITUENTS
Filed March 1, 1965
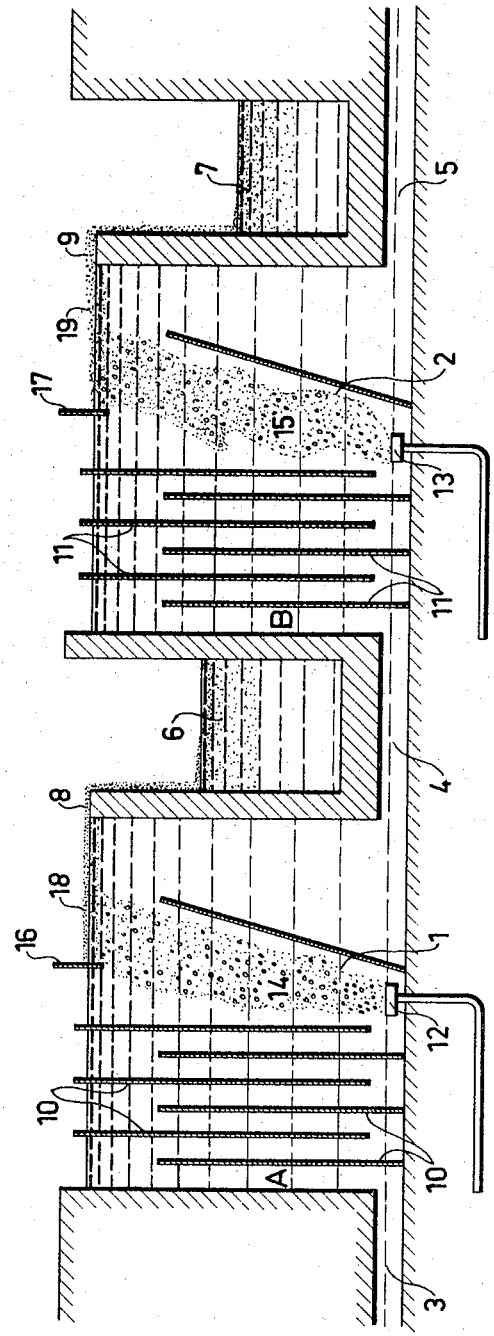
INVENTOR
Ernst Arne Rubin
BY *Prince, Schiffler & Parker*
ATTORNEYS

3,313,795
METHOD OF TREATING A LIQUID CONTAINING DISSOLVED PROTEINACEOUS CONSTITUENTS
Ernst Arne Rubin, Lund, Sweden, assignor to AB Purac, Lund, Sweden, a Swedish company
Filed Mar. 1, 1965, Ser. No. 436,724
2 Claims. (Cl. 260—112)

The present invention refers to a method of treating a liquid containing dissolved proteinaceous constituents for the purpose of precipitating and collecting said constituents.

Within the part of industry which treats and processes proteinaceous products, for example fruit processing industries, potato-flour factories, slaughter-houses, fishmeal factories and bonemeal factories, large quantities of rinsing-water and other water are consumed which are required in the production but are then discharged as waste water. However, this waste water contains relatively large quantities of proteinaceous substances which have great value and therefore advantageously may be collected.

It is well-known, for example, to treat the waste water obtained in the manufacture of potato-flour with a weakly cationic substance, namely lignin sulfonic acid which under certain conditions precipitates part of the protein dissolved in the waste water. The conditions to be satisfied so that a precipitation of practical importance may take place is that the waste water must be strongly acid, and therefore considerable quantities of some acid, i.e. sulfonic acid, must be added to the waste water.

At this addition of acid also part of the starch contained in the waste water is, however, converted into sugar by hydrolysis. This formation of sugar is a great disadvantage, since sugary waste water cannot simply be discharged into lakes and water courses, but the sugar must be fermented by adding cultures of bacteria, which naturally is a time wasting and costly purifying procedure.

Furthermore, it has been found that the precipitates which are formed when adding lignin sulfonic acid to the strongly acid waste water can be floated only with difficulty, so that the collection of the precipitates obtained becomes difficult.

These disadvantages are avoided by the invention which is characterized by the fact that there is added to the liquid to be treated a strongly cationic substance, which precipitates part of the proteins dissolved in the liquid, which are thereupon floated by means of air bubbles which are obtained from a water/air dispersion introduced into the liquid and are collected by mechanical means, and that there are then added to the liquid basic substances so as to impart to the liquid a pH-value exceeding 7, whereupon a neutral salt is added which precipitates both part of the proteins remaining in the liquid and proteides dissolved in the liquid, said precipitated constituents being raised by flotation to the surface of the liquid, from where they are removed by collecting means.

An example of carrying out the invention will be described in the following with reference to the accompanying diagrammatic drawing, which illustrates a device for carrying out the method according to the invention. The device consists of two basins 1 and 2, which communicate with each other through tthe channel 4. The proteinaceous waste water is supplied to the basin 1 through the supply channel 3. The waste water which is obtained for example from potato-flour factories is generally weakly acid. If, however, the waste water to be treated should be basic, an acid must be added before or in connection with the introduction of the waste water into the basin 1. The waste water introduced into the basin 1 and thus adjusted to a suitable pH-value is mixed at A with a strongly cationic substance, for example a mixed condensate of organic amide with formaldehyde. To facilitate a careful mixing of the added cationic substance with the waste water the basin 1 is provided with a so called precipitation or flocculation labyrinth 10, in which the precipitation or flocculation of the waste water takes place.

When the waste water is continuously pumped into the basin 1 through the supply channel 3, it will pass the flocculation labyrinth together with the precipitated proteins, whereupon the precipitated flocs are raised by means of air bubbles 14 obtained from a nozzle 12 towards the surface, where the aggregation of the flocculated protein 18 is removed and conveyed to the collection tank 6 by means of a scraper 16 or any other mechanical means.

After the waste water in the basin 1 has been flocculated and floated, the purified water is led through the channel 4 to the basin 2, where it has first added to it a basic substance, for example lime, to raise the pH-value of the weagly acid waste water to a value between 7 and 8. The waste water having been made basic by the treatment is mixed at B with a neutral salt, for example common salt, which in the flocculation labyrinth 11 precepitates part of the remaining proteinaceous substances and proteides dissolved in the waste water, i.e. compounds between proteins and other substances.

In the same way as in the basin 1 the precipitated flocks are flotated in the basin 2 by means of air bubbles 15, which are obtained from the nozzle 13 fed with an air/water dispersion. Furthermore, the flocks 19 collected on the surface of the basin 2 are removed by means of a scraper 17 and conveyed to a collection tank 7 for further treatment.

The purified waste water is discharged through the channel 5 into a lake or some water course, if the sugar content of the water is such that a direct discharge may occur. Otherwise the purified waste water is passed to a fermentation tank, in which the sugar is caused to ferment. It is of course also possible to return the waste water to the factory, where it may again serve as rinsing water or the like.

Since no acid is added to the starchy waste water, no hydrolysis of the starch present in the water and no formation of sugar takes place, so that fermentation of sugar needs to be undertaken only in exceptional cases. In the prior methods, on the other hand, which operate with the precipitation of a strongly acid waste water, the sugar content may be many times greater than in the example stated.

Furthermore, the two stage method according to the invention presents not only the advantage, that a greater part of the proteins dissolved in the waste water may be collected, but also that the otherwise inaccessible proteides may be precipitated by the neutral salt added in the basin 2. By avoiding making the waste water strongly acid in accordance with the old technique it is possible to flotate the precipitate and separate it from the waste water in a rapid, efficient and cheap way.

The application of the invention is of course not limited to the arrangement shown in the example, with flocculation labyrinths and mechanical scrapers, and similarly the precipitation agents are of course not limited to a mixed condensate of organic amide and formaldehyde or to a common salt, respectively, but any strong cationic substance and any neutral salt may be used as a precipitation agent.

I claim:

1. A method of treating a weakly acid liquid containing a dissolved proteinaceous material which comprises adding a strongly cationic material which precipitates a part of said proteinaceous material to said liquid, introducing air bubbles into the resulting mixture and thereby floating the precipitated proteinaceous material to the surface of the liquid, mechanically separating the resulting floated material from the liquid, adding a basic substance to the liquid in quantity sufficient to raise its pH value to above 7, adding a neutral salt which precipitates both protein and proteides to the liquid, introducing air bubbles into said liquid and thereby floating the precipitated protein and proteides to the surface of the liquid and mechanically separating the floated material from said liquid.

2. A method as defined in claim 1 in which said liquid containing dissolved proteinaceous material has a pH value of from 6 to 7.

References Cited by the Examiner

UNITED STATES PATENTS

| | | | |
|---|---|---|---|
| 966,196 | 8/1910 | Goodman | 260—122 |
| 1,229,919 | 6/1917 | Ebrill et al. | 260—120 |
| 2,368,919 | 2/1945 | Fritzberg | 260—120 |
| 2,519,606 | 8/1950 | Sharp | 260—120 |
| 2,776,291 | 1/1957 | Russo | 260—112 X |
| 2,790,790 | 4/1957 | Klostergaard | 260—118 X |

OTHER REFERENCES

Hansen, C. A., et al., Sewage Treatment by Flotation, Sewage Works Journal, vol. 15, 1943, pp. 242–252.

Metcalf, L., et al., American Sewerage Practice, vol. III, Disposal of Sewage, third edition, 1935, McGraw-Hill, New York, pp. 41–42.

MORRIS O. WOLK, *Primary Examiner.*

MICHAEL E. ROGERS, *Examiner.*